(12) United States Patent
Knudsen

(10) Patent No.: US 7,361,112 B2
(45) Date of Patent: Apr. 22, 2008

(54) TRANSMISSION APPARATUS

(76) Inventor: William S. Knudsen, 963 Contra Costa Blvd., Pleasant Hill, CA (US) 94523

( * ) Notice: Subject to any disclaimer, the term of this patent is extended or adjusted under 35 U.S.C. 154(b) by 39 days.

(21) Appl. No.: 11/313,930

(22) Filed: Dec. 22, 2005

(65) Prior Publication Data
US 2007/0149340 A1 Jun. 28, 2007

(51) Int. Cl.
F16H 37/02 (2006.01)
(52) U.S. Cl. ........................ 475/211; 475/218
(58) Field of Classification Search ................ 475/207, 475/210, 211, 212, 213, 216, 218, 219, 338, 475/332
See application file for complete search history.

(56) References Cited

U.S. PATENT DOCUMENTS

| 2,164,818 | A | * | 7/1939 | Heyer et al. ................ 475/211 |
| 2,530,310 | A | * | 11/1950 | McFarland ................. 475/218 |
| 3,133,455 | A | | 5/1964 | White |
| 4,063,467 | A | | 12/1977 | F'Geppert |
| 4,824,419 | A | | 4/1989 | Kumm |
| 5,121,936 | A | * | 6/1992 | Cowan ........................ 280/236 |
| 5,269,734 | A | | 12/1993 | Menge, Sr. |
| 5,827,146 | A | * | 10/1998 | Yan et al. ................... 475/210 |
| 6,010,423 | A | | 1/2000 | Jolliff et al. |
| 6,129,061 | A | | 10/2000 | Okuda et al. |
| 6,931,959 | B2 | * | 8/2005 | Giuriati ....................... 74/413 |
| 6,945,897 | B2 | * | 9/2005 | Vornehm .................... 475/211 |
| 2004/0157695 | A1 | * | 8/2004 | Ishikawa et al. ............ 475/207 |

FOREIGN PATENT DOCUMENTS

JP 62209260 9/1987
JP 63038757 2/1988

* cited by examiner

Primary Examiner—Sherry Estremsky
(74) Attorney, Agent, or Firm—Theodore J. Bielen, Jr.

(57) ABSTRACT

A transmission mechanism utilizing a source of power which includes a main input shaft that turns upon receipt of power from said source. An auxiliary shaft is turned by the main input shaft through a link that turns the auxiliary shaft at a variable rate relative to the main shaft. A ring gear rotating with the main shaft includes a spur gear in meshing engagement with the same. A gear wheel rotating with the auxiliary shaft connects to the spur gear, via a bearing, for rotation along the ring gear. An output shaft is linked to the spur gear such that the output shaft turns according to the relative turning between the ring gear and the spur gear.

6 Claims, 5 Drawing Sheets

TRANSMISSION APPARATUS

BACKGROUND OF THE INVENTION

The present application relates to a novel and useful transmission mechanism.

Transmissions for vehicles are used to transfer energy or power from a source to wheels or other motive means. In essence, the transmission converts a single speed of rotary motion to a variety of output speeds on an output shaft linked to the wheels of a vehicle. Typically, a number of gears are also used to determine the speed of the output shaft in order to allow the vehicle to attain the various speeds necessary to successfully move along various terrain environments.

In the past, many variable speed transmission systems have been proposed. For example, U.S. Pat. Nos. 5,269,734 and 6,129,061 show gear reducing devices which incorporate a plurality of gears along an input shaft to transfer mechanical rotation to an output shaft through a planetary gear arrangement.

U.S. Pat. No. 3,133,455 and 4,063,467 show speed changers utilizing pulleys to provide variable transmission between a driving shaft and at least one output shaft.

U.S. Pat. No. 6,010,423 describes a reversible variable speed transmission which includes a rotatable input member and a pump for pumping fluid through a conduit. A gear train is operatively coupled to the input member in the pump to move the output shaft either in a forward or reverse direction.

U.S. Pat. No. 4,824,419 describes a flat belt continuously variable transmission in which guide way disks provided with spirals support a belt to maintain an effective diameter of a pair of pulleys. A planetary gear system meshes with star gears to vary the output shaft rotation.

Patent abstracts of Japan 62209260 and 63038757 describe variable pulley drive devices for varying the output speed of a shaft utilizing a sun gear mounted on the input shaft. A ring gear is also arranged outside a sun gear in concentric fashion in order to allow axial movement of the sun gear.

A transmission mechanism utilizing a source of power which is capable of varying speed and direction of an output shaft in an efficient manner would be a notable advance in the automotive arts.

BRIEF SUMMARY OF THE INVENTION

In accordance with the present invention a novel and useful transmission invention utilizing a source of power to vary the speed and direction of an output shaft is herein provided.

The mechanism of the present invention utilizes a main input shaft which is rotated by receipt of power from a source such as an automotive engine, and electrical motor, a steam engine, and the like. In any case, the rotation of the main input shaft serves as the mode of force for the remaining components of the transmission mechanism of the present invention. The main input shaft is fed into first link in the form of a power transmitter which transfers rotational motion from the main input shaft to rotational motion of an auxiliary shaft. Such link allows for the variable rate of turning of auxiliary shaft relative to the main shaft. In this regard, the first link may take the form of a variable drive pulley, which is known in the art, or other equivalent apparatuses.

The main shaft also turns a ring gear having at least one spur gear meshingly engaging the ring gear. The ring gear generally lies beyond the first link and may include intermediate shafts which are directly connected to and coaxial with the main input shaft. Each spur gear meshingly engaging the ring gear includes a shaft which extends outwardly from the ring gear, the purpose of which will be discussed hereinafter.

A wheel, or planet shaft carrier, which may take the form of a gear wheel, is linked to rotate with the auxiliary shaft. Such linkage may include a chain and sprocket mechanism, but is certainly not limited to this structure. In addition, the outward projection of the shafts of each of the spur gears in meshing engagement with the ring gear, effects rotation of the spur gears relative to the ring gear. Such connection may take the form of a bearing extending through the gear wheel allowing relative motion between the spur gear shaft and the gear wheel which also contacts such bearing.

An output shaft is located apart from the input shaft and may be coaxially positioned relative to, but separated from, the input shaft. A second link rotatably connects at least one spur gear to the output shaft such that the output shaft turns according to the relative turning of the ring gear and the spur gear. Of course, such turning ultimately derives from the rate of rotation of the auxiliary gear through the linkage heretofore described. The second link may take the form of a gear connected to the output shaft which meshingly engages another gear connected to the shaft of the spur gear which extends through the gear wheel. Preferably, the gear connected to the output shaft comprises a sun gear, while each gear, linked to a spur gear shaft; meshingly engaging such sun gear may be considered a planetary gear. Of course, where multiple spur gears are employed to engage the ring gear, multiple planetary gears would meshingly engage the sun gear about the axis of the output shaft.

Thus, by altering the rate of rotation of the auxiliary shaft, through the mechanism here and above described, the output shaft would turn at a rate and direction which may be the same as the input shaft, a speed and direction neutral relative to the input shaft, or at a speed and in a direction reverse from the input shaft.

It may be apparent that a novel and useful transmission mechanism has been heretofore described.

It is therefore an object of the present invention to provide a transmission mechanism which is capable of utilizing a rotating input shaft and driving an output shaft through a variety of speeds and directions.

Another object of the present invention is to provide a transmission mechanism which utilizes a source of power to turn an input shaft which is energy efficient.

Another object of the present invention is to provide a transmission mechanism, utilizing a source of power to turn an input shaft, which provides a large ratio spread between the input shaft and the output shaft.

Another object of the present invention is to provide a transmission mechanism utilizing a source of power to turn an input shaft which is continuously variable in its output between a reverse turning of an output shaft to an overdrive turning of an output shaft.

A further object of the present invention is to provide a transmission mechanism utilizing a source of power to an input shaft which eliminates the use of clutches and torque converters or, at least, relegates these elements to a back-up status.

A further object of the present invention is to provide a transmission mechanism, utilizing a source of power to turn an input shaft which turns an output shaft at a desired speed at any desired engine speed and used as a source of power to the input shaft.

A further object of the present invention is to provide a transmission mechanism utilizing a source of power which may be controlled manually or through a computer.

Yet another object of the present invention is to provide a transmission mechanism utilizing a source of power which includes a relatively small number of moving parts.

The invention possesses other objects and advantages especially as concerns particular characteristics and features thereof which will become apparent as the specification continues.

Figure 1:
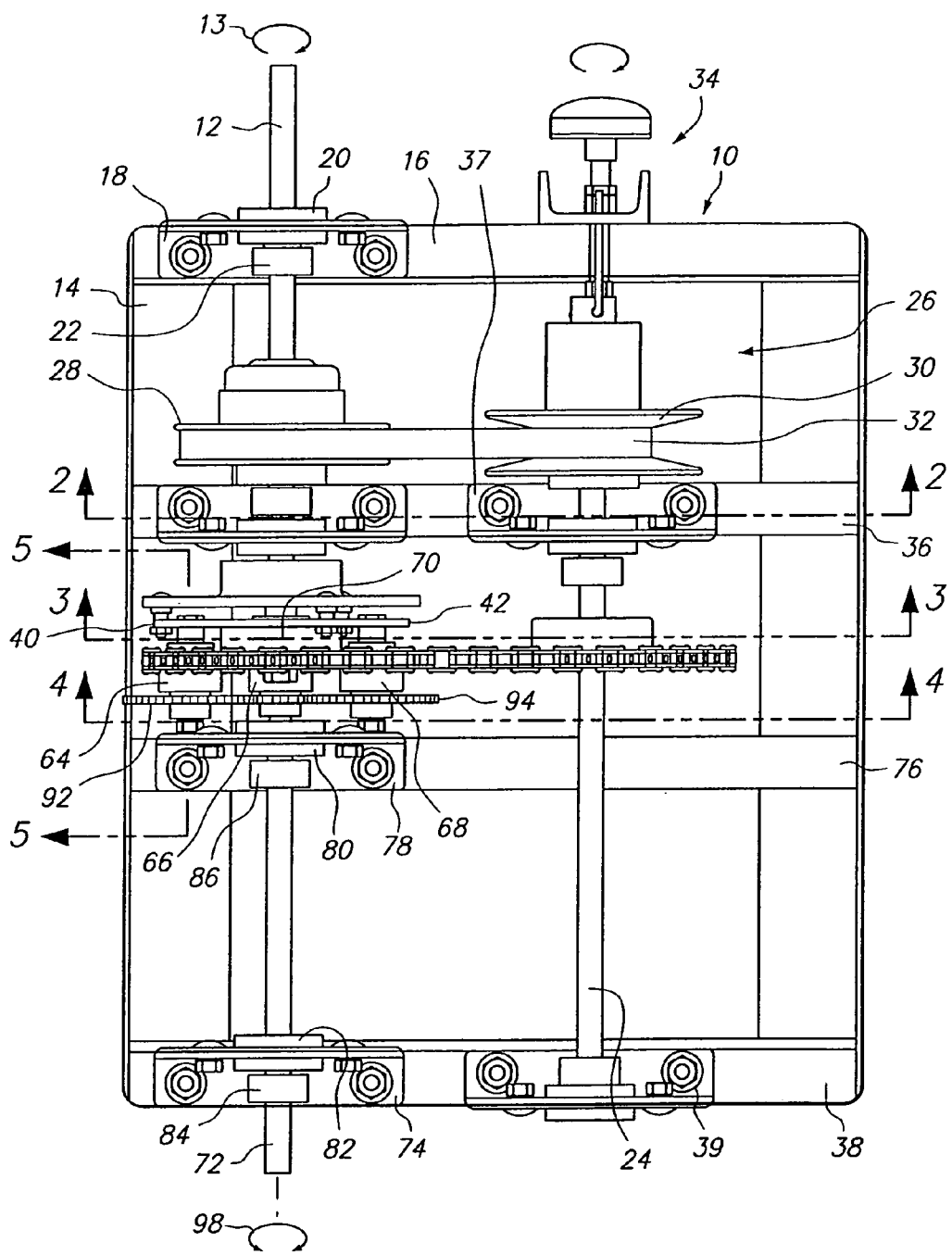
FIG. 1 is a top plan view of a transmission mechanism of the present invention.

For a better understanding of the invention reference is made to the following detailed description of the preferred embodiments thereof which should be reference to the prior described drawing.

DETAILED DESCRIPTION OF THE PREFERRED EMBODIMENTS OF THE INVENTION

Various aspects of the present invention will evolve from the following detailed description of the preferred embodiments thereof which should be taken together with the hereinabove described drawing.

A preferred embodiment of the invention is shown in the drawing, as a whole, by reference character 10. Transmission mechanism 10 includes as one of its elements a main input shaft 12 receiving power from a source (not shown) which may be an automotive engine, and electric motor, a steam engine, and the like. In any instance, source of power turns input shaft 12 according to directional arrow 13. Input shaft is mounted to a base member 14, specifically to step 16 via bracket 18. Bearing 20 and spacer 22 hold input shaft 12 in place.

Generally parallel to input shaft 12 is an auxiliary shaft 24. Auxiliary shaft 24 extends from a first link 26 which is in the form of a variable speed pulley. Driving pulley 28 is driven by input shaft 12, while driven pulley turns auxiliary shaft 24. Belt 32 links driving pulley 28 to driven pulley 30. An adjustment mechanism 34 determines the rate of turning of driven pulley 30 and, thus, the rate of turning of auxiliary shaft 24. It should be understood, that variable speed pulley 24 is a prior art commercially available product. It should also be noted that first link may take other forms such as electrical or hydraulic elements between input shaft 12 and auxiliary shaft 24 to determine the relative rate of turning between such shafts. It should be realized that auxiliary shaft 24 may be located coaxially with input shaft 12. Auxiliary shaft is held to steps 36 and 38 by bolted brackets 37 and 39, respectively, FIGS. 1 and 2.

Figure 2:
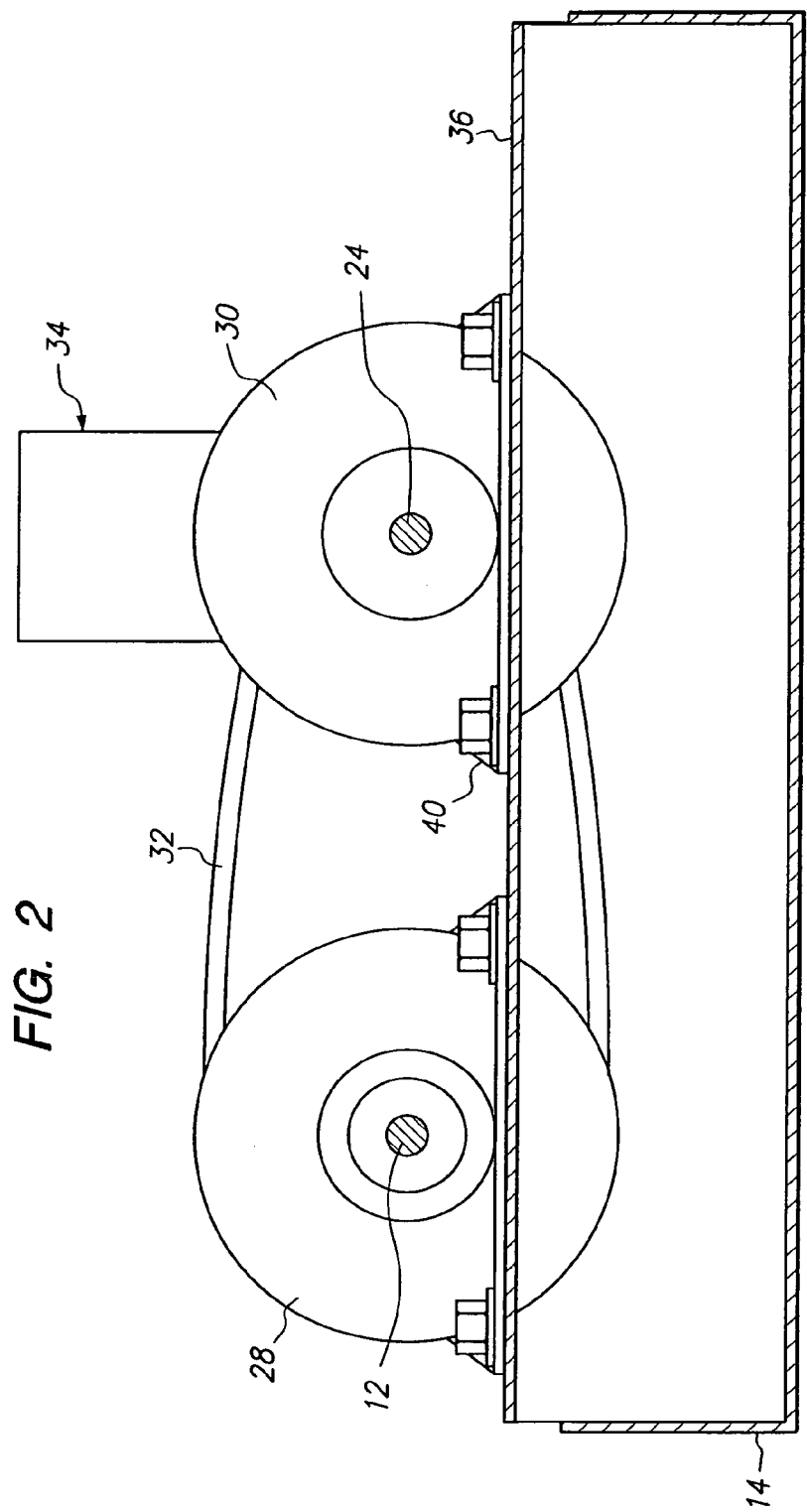
FIG. 2 is a sectional view taken along line 2-2 of FIG. 1.
Figure 3:
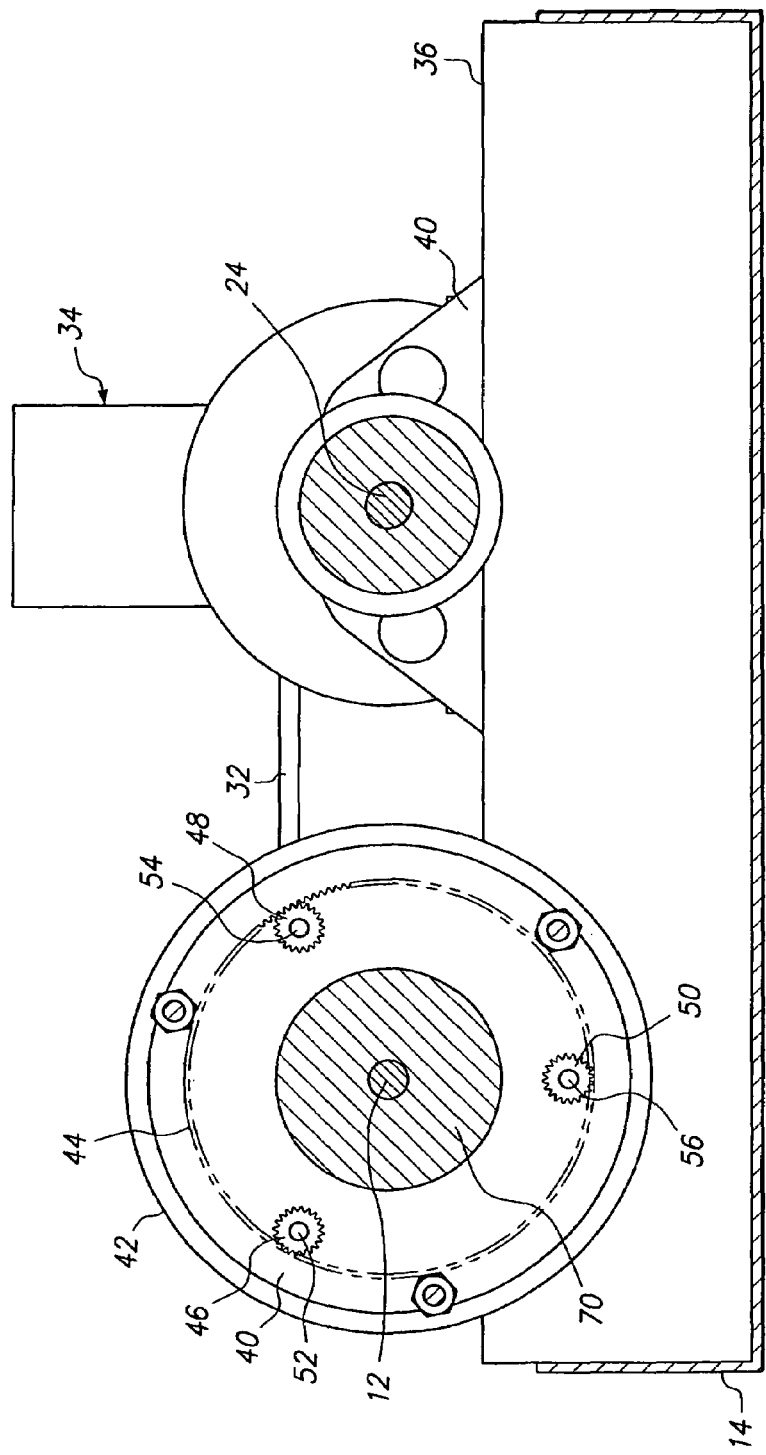
FIG. 3 is a sectional view taken along line 3-3 of FIG. 1.

Turning now to FIG. 3, it may be observed that a ring gear 40 is connected to input shaft 12 for rotation via hub 42, FIGS. 1 and 3. Ring gear 40 includes a circular toothed surface 44 which meshingly engages spur gears 46, 48, and 50. It should be noted that each spur gear 46, 48, 50 includes a shaft 52, 54, and 56, respectively, that extends outwardly from ring gear 40 and away from variable speed pulley 26.

Figure 4:
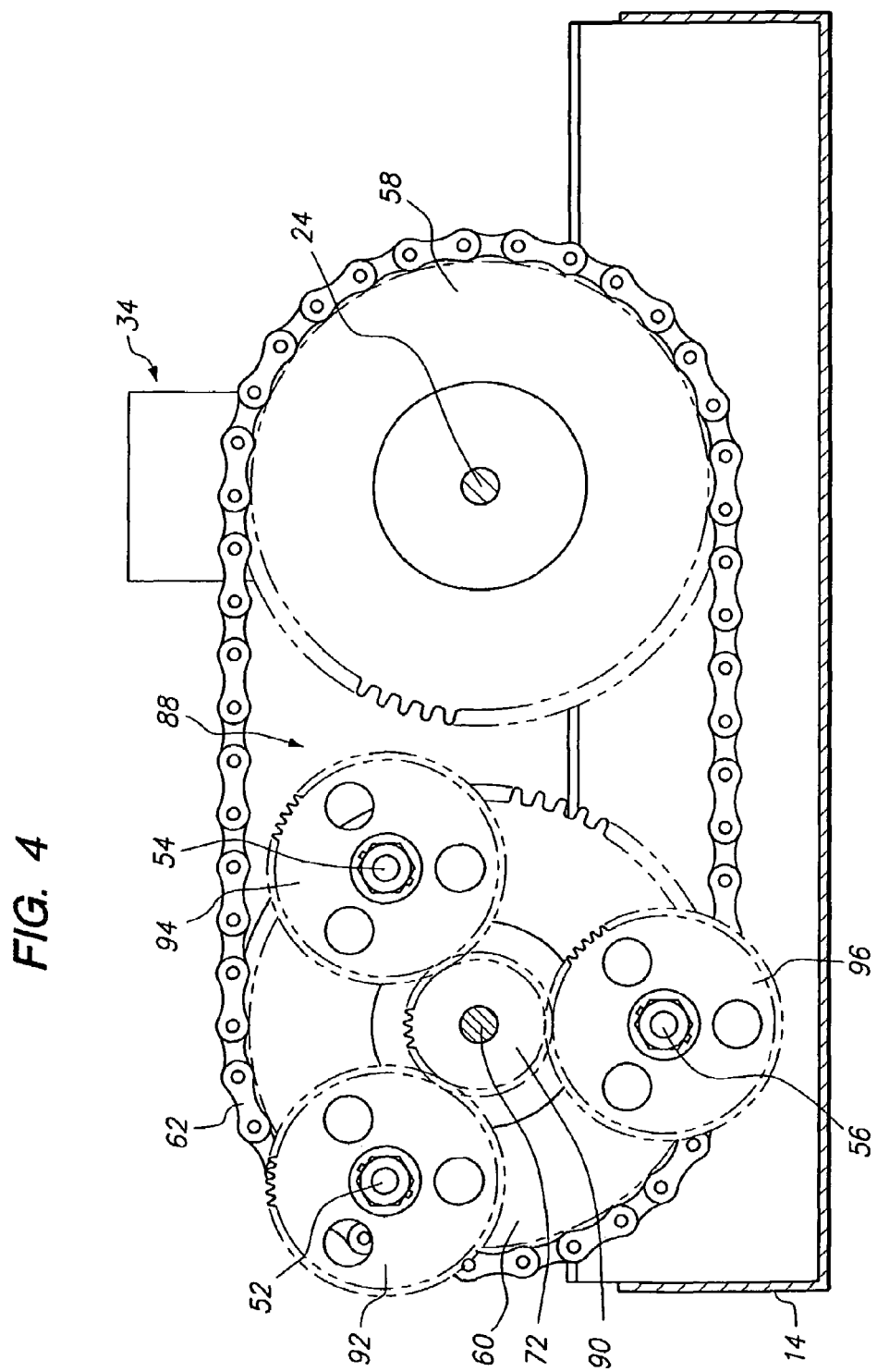
FIG. 4 is a sectional view taken along line 4-4 of FIG. 1.

With reference to FIG. 4, it may be observed that auxiliary shaft 24 is fixed to a toothed, or gear, wheel or sprocket 58 which is linked to sprocket or toothed wheel or sprocket 60 by chain 62. Of course, wheel 60 may be linked to sprocket or wheel 58 by other means such as a pulley and the like. Most importantly, spur gear shafts 46, 48, and 50 extend through wheel 60 and are, thus, turned with wheel 60 dependant on the rotation of auxiliary shaft 24 and sprocket 58. Each of the spur gears 46, 48, and 50 extend through a bearing shown as bearing 64, 66, and 68, respectively, on FIG. 1. Likewise, wheel 60 rotates about a bearing 70, depicted on FIGS. 1 and 3. Needless to say, bearings 64, 66, 68, and 70 permit the rotation of wheel 60 and spur gears 46, 48, and 50 relative to ring gear 40 independently of the movement of input shaft 12 and ring gear 40. However, wheel 60 is able to move spur gears 46, 48, and 50 in meshing engagement with toothed surface 44 of ring gear 40 dependant on rotation of auxiliary shaft 24.

Output shaft 72 is also found in mechanism 10 of the present invention. Output shaft 72 is held to step 38 by bolted bracket 74 and to step 76 of base member 14 by bolted bracket 78, and lie apart from input shaft 12. Shaft is supported in this position by bearings 80 and 82 as well as spacers 84 and 86, FIG. 1.

Figure 5:
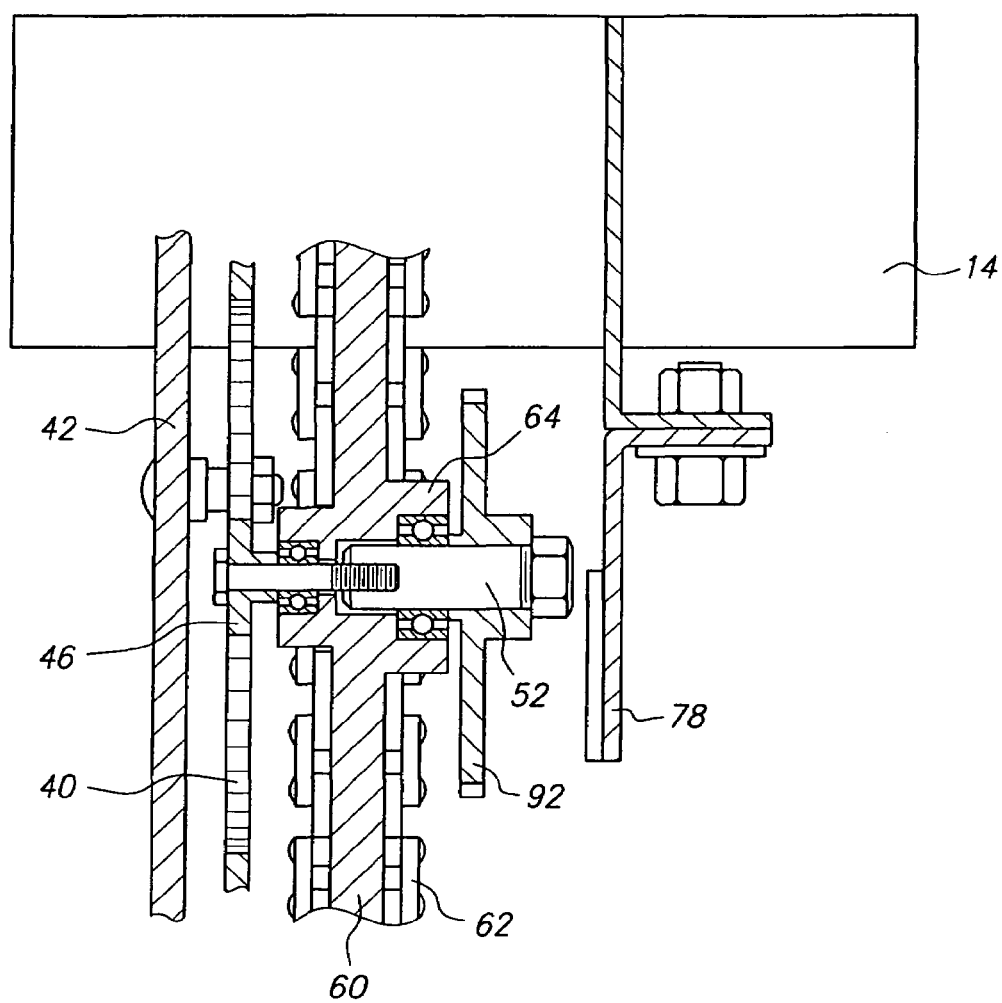
FIG. 5 is a sectional view taken along line 5-5 of FIG. 1.

A link 88 rotatably connects spur gears 46, 48, and 50 to output shaft 72. Such link takes place through spur gear shafts 52, 54, and 56 which are passed through wheel 60 and allowed to rotate with respect to bearings 64, 66, and 68 respectively. With reference to FIG. 4, it may be observed that link 88 takes the form of a sun gear 90 fixed to rotate with output shaft 72, and planetary gears 92, 94, and 96 which meshingly engage sun gear 90 and are fixed for rotation with spur gear shafts 52, 54, and 56, FIGS. 4 and 5. Thus, sun gear 90 and planetary gears 92, 94, and 96 serve as a connector between output shaft 72 and spur gear shafts 52, 54, and 56.

In operation, input shaft 12 receives rotational motion from a source of power (not shown). Input shaft operates variable speed pulley by turning driving pulley 28. Belt 32 transmits this motion to driven pulley 30 which is part of an adjustment mechanism 34 to provide variable speed to driven pulley 30. Driven pulley 30 is linked to auxiliary shaft 24. Auxiliary shaft 24 is fixed to a sprocket 58 and is itself connected, via chain 62, to a wheel or sprocket 60. A ring gear 40 which is fixed to input shaft 12 turns and includes a toothed surface 44 that engages spur gears 46, 48, and 50. Shafts 52, 54, and 58 of spur gears 46, 48, and 50, respectively, extend through wheel 60 but are free to turn, as is wheel 60, via bearings 64, 66, 68, and 70 respectively. The shafts 52, 54, and 56 of spur gears 46, 48, and 50, respectively, connect to planetary gears 92, 94, and 96, respectively. Planetary gears 92, 94, and 96 engage sun gear 90 which turns output shaft 72 according to directional arrow 98, FIG. 1. In embodiment 10 depicted in FIGS. 1-5, a 12.5% control variation between input shaft 12 and auxiliary shaft 24 produce a range of motion of output shaft 72 between 50% reverse to 100% (a ratio of 1:2) overdrive, a 250% ratio spread. Driving ring gear 40 and input shaft 12 7.5% faster than auxiliary shaft 24 will produce a 50% reverse movement of output shaft 72. Driving main input shaft 12 and ring gear 40 5% faster than auxiliary shaft 24 will produce a zero output of output shaft 72 i.e. neutral. Rotating input shaft 12 and auxiliary shaft 24 via variable speed pulley 26 at the same speed, the first link, will produce a 1 to 1 movement of output shaft 72. In this mode there is relative movement between spur gears 46, 48, and 50, and ring gear 40. Also, a zero mesh speed exists between planet gears 92, 94, and 96 with sun gear 90, at this time. Moving auxiliary shaft 24 5% faster than output shaft 12 will produce a 100% overdrive motion. Needless to say, a large variation between the movements of input shaft 12 and auxiliary shaft 24 will result in a variable transmission mechanism 10 with an enormous and almost infinite variety of combinations of the same. Of course, the gear ratios of the elements of mechanism 10 may be varied producing different results to those expressed above.

While in the foregoing, embodiments of the present invention have been set forth in considerable detail for the purposes of making a complete disclosure of the invention, it may be apparent to those of skill in the art that numerous changes may be made in such detail without departing from the spirit and principles of the invention.

What is claimed is:

1. A transmission mechanism utilizing a source of power, comprising:
    a. a main input shaft, said main input shaft rotating by receipt of power from said source of power;
    b. an auxiliary shaft;
    c. a link transmitting power from said main input shaft to said auxiliary shaft, said link turning said auxiliary shaft at a variable rate relative to said main shaft;
    d. a ring gear turning with said turning of said main shaft, said ring gear including at least one spur gear meshingly engaging said ring gear;
    e. a wheel linked to rotate with said auxiliary shaft said spur gear including a shaft, said spur gear shaft being connected to said wheel for rotation of said spur gear along said ring gear;
    f. at least a first gear said gear being held to said spur gear shaft;
    g. an output shaft; and
    h. a second gear, said second gear being connected to said output shaft, said second gear meshingly engaging said first gear.

2. The mechanism of claim 1 in which said wheel linked to rotate with said auxiliary shaft further includes a chain and a sprocket fixed to said auxiliary shaft, said chain engaging said wheel.

3. The mechanism of claim 1 in which said first link comprises a variable speed pulley.

4. The mechanism of claim 1 in which said output shaft is coaxially located relative to said main input shaft.

5. The mechanism of claim 1 in which said first gear comprises a planetary gear and said second gear comprises a sun gear.

6. The mechanism of claim 2 in which said sprocket fixed to said auxiliary shaft comprises a first sprocket and said wheel comprises a second sprocket, said first and second sprockets engaging said chain.

* * * * *